United States Patent
Shichman

(10) Patent No.: US 6,688,035 B1
(45) Date of Patent: Feb. 10, 2004

(54) METHOD AND DEVICE FOR PRODUCING CARBON DIOXIDE AND WATER VAPOR NEAR AN INSECT KILLING FIELD

(76) Inventor: Daniel Shichman, 20 Copper Kettle Rd., Trumbull, CT (US) 06611

( * ) Notice: Subject to any disclaimer, the term of this patent is extended or adjusted under 35 U.S.C. 154(b) by 0 days.

(21) Appl. No.: 10/279,234

(22) Filed: Oct. 25, 2002

(51) Int. Cl.$^7$ .......................... A01M 1/22; A01M 1/02
(52) U.S. Cl. .............................. 43/112; 43/107; 43/113
(58) Field of Search .......................... 43/107, 112, 113, 43/125; 362/159, 161, 163, 180–182; 431/291; 422/125, 126

(56) References Cited

U.S. PATENT DOCUMENTS

| | | | | |
|---|---|---|---|---|
| 138,805 A | * | 5/1873 | Isham | 362/180 |
| 370,770 A | * | 10/1887 | Drumheller | 362/163 |
| 449,138 A | * | 3/1891 | Roth | 43/113 |
| 483,386 A | * | 9/1892 | Ormsby | 362/163 |
| 521,829 A | * | 6/1894 | Stevens | 362/180 |
| 550,345 A | * | 11/1895 | Humphreys et al. | 43/113 |
| 564,762 A | * | 7/1896 | Pryor | 362/161 |
| 1,000,502 A | * | 8/1911 | Estes | 362/180 |
| 1,091,248 A | * | 3/1914 | Sarkadi | 362/161 |
| 2,918,750 A | * | 12/1959 | Blatt | 43/125 |
| 4,248,005 A | * | 2/1981 | Hedstrom | 43/112 |
| 4,260,365 A | * | 4/1981 | Kayne | 431/291 |
| 4,506,473 A | * | 3/1985 | Waters, Jr. | 43/107 |
| 4,519,776 A | * | 5/1985 | DeYoreo et al. | 43/112 |
| 4,566,055 A | * | 1/1986 | Klees et al. | 362/180 |
| 4,603,505 A | * | 8/1986 | Millard | 43/112 |
| 4,785,573 A | * | 11/1988 | Millard | 43/112 |
| 4,962,611 A | * | 10/1990 | Millard | 43/112 |
| 5,127,825 A | * | 7/1992 | Tendick, Sr. | 362/180 |
| 5,205,064 A | * | 4/1993 | Nolen | 43/112 |
| 5,205,065 A | * | 4/1993 | Wilson et al. | 43/113 |
| 5,231,790 A | * | 8/1993 | Dryden et al. | 43/113 |
| 5,241,779 A | * | 9/1993 | Lee | 43/112 |
| 5,274,609 A | * | 12/1993 | Bradley | 43/113 |
| 5,669,176 A | * | 9/1997 | Miller | 43/107 |
| 5,683,239 A | * | 11/1997 | Cardosi | 431/291 |
| 5,722,763 A | * | 3/1998 | Chen | 362/163 |
| 5,799,436 A | * | 9/1998 | Nolen et al. | 43/112 |
| 6,050,025 A | * | 4/2000 | Wilbanks | 43/112 |
| 6,055,766 A | * | 5/2000 | Nolen et al. | 43/112 |
| 6,088,949 A | * | 7/2000 | Nicosia et al. | 43/107 |
| 6,145,243 A | * | 11/2000 | Wigton et al. | 43/107 |
| 6,209,256 B1 | * | 4/2001 | Brittin et al. | 43/107 |
| 6,474,014 B1 | * | 11/2002 | Yu | 43/112 |
| 6,516,559 B1 | * | 2/2003 | Simchoni et al. | 43/107 |
| 6,530,172 B2 | * | 3/2003 | Lenz | 43/112 |
| 6,568,124 B1 | * | 5/2003 | Wilbanks | 43/112 |
| 6,591,545 B2 | * | 7/2003 | Brunet | 43/112 |

FOREIGN PATENT DOCUMENTS

| | | | | |
|---|---|---|---|---|
| AT | 20529 B1 | * | 6/1905 | 43/113 |
| AT | 45845 B1 | * | 1/1911 | 43/113 |
| DE | 244758 B1 | * | 3/1912 | 43/113 |
| FR | 792294 B1 | * | 12/1935 | 43/113 |
| GB | 20798 B1 | * | of 1908 | 43/113 |
| GB | 8884 B1 | * | of 1909 | 43/113 |
| JP | 7-203821 B1 | * | 8/1995 | |
| JP | 10-229801 B1 | * | 9/1998 | |
| JP | 11-346629 B1 | * | 12/1999 | |
| JP | 2000-139318 B1 | * | 5/2000 | |
| WO | WO-92/17060 B1 | * | 10/1992 | |

* cited by examiner

Primary Examiner—Darren W. Ark

(57) ABSTRACT

A method and device is described for producing carbon dioxide and water vapor, together as an insect attractant, near an insect killing field. The invention describes an economical and convenient way of producing the insect attractant by utilizing paraffin in combustion.

13 Claims, 2 Drawing Sheets

METHOD AND DEVICE FOR PRODUCING CARBON DIOXIDE AND WATER VAPOR NEAR AN INSECT KILLING FIELD

BACKGROUND OF THE INVENTION

This invention describes a system to lure and kill insect such as mosquitoes with an electrocuting killing field and producing carbon dioxide and water vapor in relatively pure form by the combustion of paraffin so as to act as an insect attractant. The method and materials used are especially economical and convenient to use. The killing field can be readily available high voltage bug electrocuter known as a "bug zapper". The intent of the invention is to produce carbon dioxide at an adequate and economical rate for use as an attractant and not optimized for light producing as is described in lantern devices. The invention also details a safe and convenient use method and apparatus for burning and reloading of paraffin candles.

Various devices as disclosed in U.S. Pat. Nos. 6,145,243 and 5,669,176 use more elaborate means such as fuel cells or catalytic conversion for the production of carbon dioxide. These devices when commercialized prove to be expensive and involved for consumer use.

U.S. Pat. No. 6,145,243 generates carbon dioxide by catalytic conversion and feeds the combustion gas to an inlet to a "trap" which requires associated devices such as a fans to have the insects follow a preferred path.

Other devices as disclosed in U.S. Pat. Nos. 4,962,611 and 4,785,573 consume kerosene in a lantern to produce light but because of incomplete or complex combustion products carbon dioxide is added from a supplemental source. In these cases the products of combustion might actually act as an insect repellant. These devices because of the flammable nature of the fuel and the electric circuits involved must include safety interlocks which have economic and convenience of use impact.

U.S. Pat. No. 5,205,064 involves providing carbon dioxide from a pressurized container. The method described in this invention can provide the gas in a much more economical and convenient way.

SUMMARY OF THE INVENTION

This invention describes a system for luring and killing insects such as mosquitoes using an economical and effective way of producing carbon dioxide and introducing the attractant to an insect electrocuting killing field.

Combustion is an economical method of producing carbon dioxide. However the products of the combustion should be essentially carbon dioxide and water, and odor free. Visible light also produced can be an added plus even though this feature is not optimized, as an attractant and an indicator to the user of device properly operating. For convenience, safety, simplicity and economy a solid paraffin is normally used. Of course the paraffin is melted prior to actual combustion.

A fuel that meets these requirements is solid paraffin wax. For the purpose of the system device disclosed the paraffin is solid at normal ambient temperatures. It can be used as a candle where the wick helps ensure complete combustion by defining a proper flame. The flame is luminous where solid particles of burning carbon can produce a fairly bright glow. An important aspect of candle use is that it be odorless except for deliberate modification.

It has also been determined that having the candle in an enclosed votive cup holder can produce adequate carbon dioxide attractant for a longer period of time and also makes for convenience and safety in reloading after use.

Figure 2:
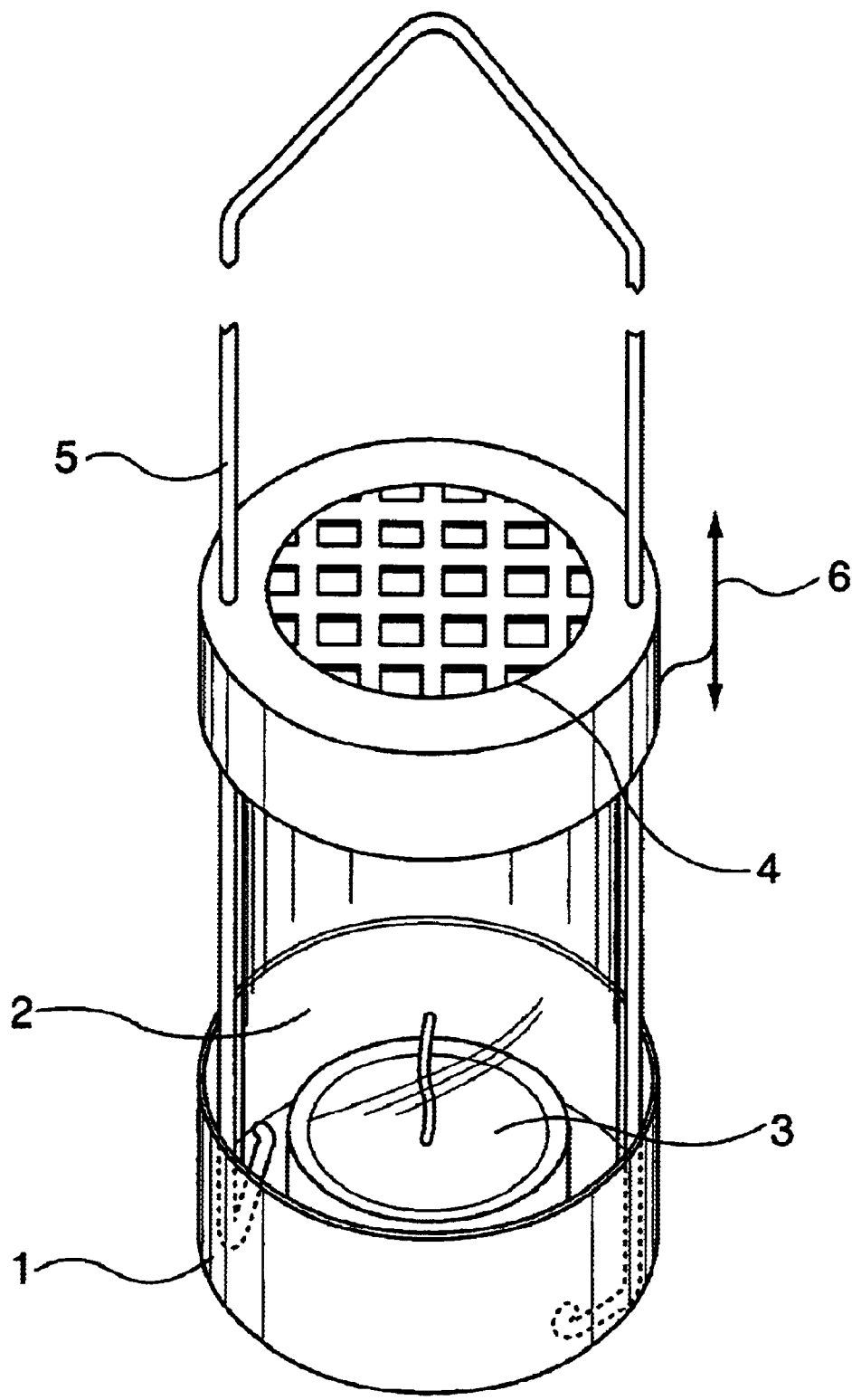

The candle holder is described in detail in FIG. 2.

DETAILED DESCRIPTION OF INVENTION

Figure 1:
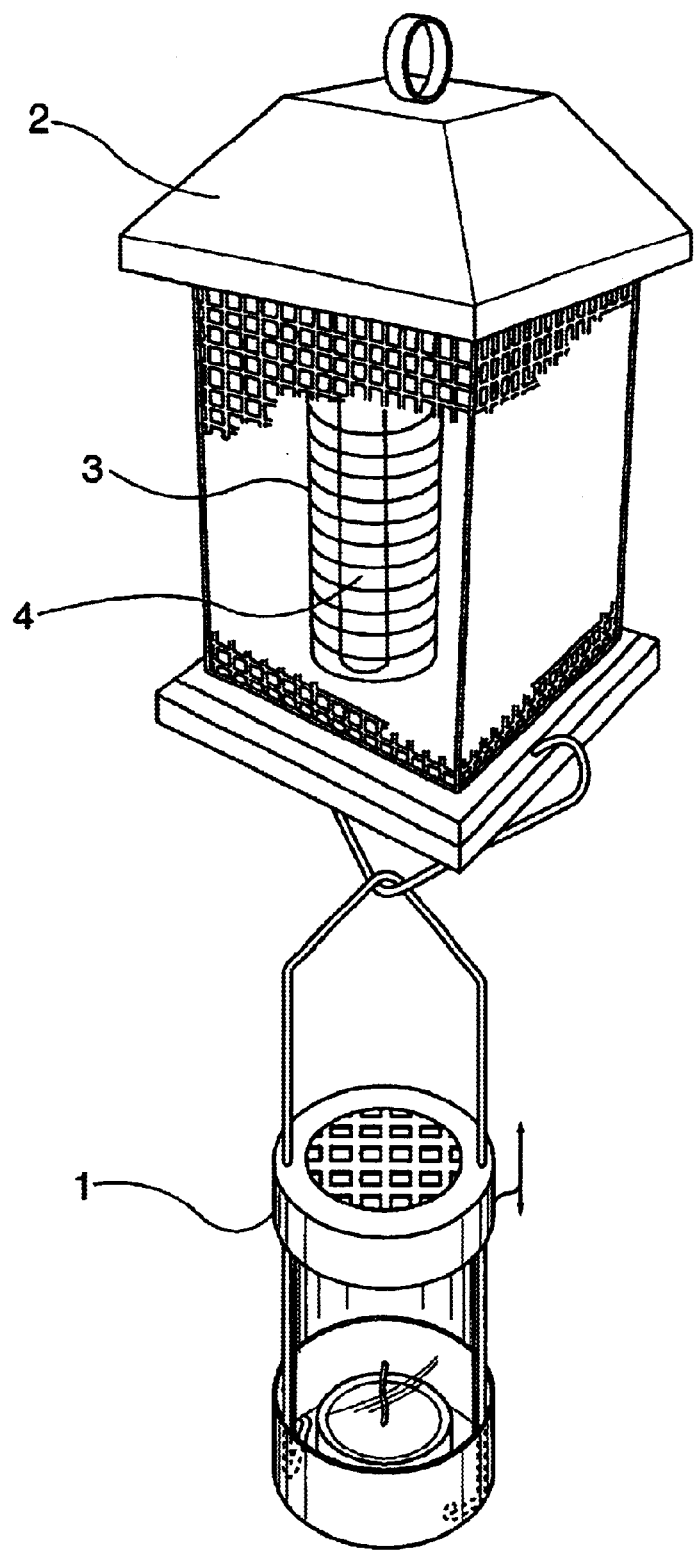
FIG. 1 describes an effective candle holder 1 used in conjunction with high voltage grid 3 and UV fluorescent bulb 4 contained in bug "zapper" 2 to attract and kill mosquitoes and other insects.

In FIG. 2 the holder assembly consists of metal tray base 1, holding a heat resistant glass cup 2 for holding a suitable candle 3. Shielding the cup and candle is a wire cloth assembly 4, which slides within the formed wire frame 5. Hooks formed in the wire frame secures the base. The wire cloth, typically 6×6 mesh, approximately 75% open, acts primarily as moth guard without which, the candle flame would be extinguished. The formed wire frame assembles the above elements and provides a loop for hanging to the killing field device shown as 2 in FIG. 1. Having the wire cloth assembly slideable (see arrows 6) and held within the formed wire frame allows the glass cup to be lifted out of the base for placing and lighting a new candle. The cup holding a lit candle is then placed back into the base and wire cloth assembly is lowered onto the cup. This can all be done with or without removing the assembly from the "bug zapper" which is normally hung about 5 to 7 ft. above the ground for safety. This arrangement makes for safe operation and convenient reloading. Having to remove the whole assembly for reloading could entail the use of a step stool or ladder whereas the removal of just the votive cup can be accomplished within hand reach.

Lighting the candle normally a "tea light" within the votive holder is useful in the outdoors. The candle within the votive holder is placed typically horizontally to shield against any air currents while lighting.

Any number of commercial bug electrocuters can be used e.g. U.S. Pat. No. 4,248,005 depicted in total as 2 in FIG. 1. These devices provide an open killing field not requiring inducing flow and apparatus such as blowers. The natural convection of the paraffin combustion gasses can permeate the killing field assembly. This is accomplished by hanging the assembly about 6 inches below the base of the bug electrocuter. A 15 watt commercial bug electrocuter (Stinger Model UV15) is a suitable unit that has produced satisfactory reduction in mosquito population in combination with the paraffin burner described.

It is typically desirable to operate the unit for about 5 hours beginning at dusk. This is an active period for mosquitoes. It can also be useful to use a 5 hour candle and only required to switch off the "zapper" before retiring. A readily available, economical candle satisfying this feature are "tea lights" measuring 1.5 in. diameter by 0.65 inches high with the paraffin and wick held in a metal cup. The metal cup of this candle helps minimize the thermal stress induced into glass cup and can extend its life before replacement is necessary.

This size candle typically weighs about 14 grams and with normal combustion will provide about 22 liters of carbon dioxide. This is equivalent to a 1 liter 300 psi pressurized container of carbon dioxide.

It should be noted that the described assembly produces an adequate rate of carbon dioxide/water attractant for mosquito killing. The rate of approximately 4 liters/hr of carbon dioxide from paraffin combustion has proven to be adequately effective.

The assembly is not optimized for producing illuminating light. To do so additional air flow would be provided for accelerated combustion as is typically done in lantern devices such is described in U.S. Pat. Nos. 5,722,763, 138,805, Austrian 45845.

The above described system assembly has been in private use through the spring, summer and part of the fall on a daily basis with excellent results in reducing mosquito population in a heavily wooded area. This invention is ideal for use by individual homeowners in that its use is convenient, economical and benefits the area adjacent to the home.

An alternative to the wire mesh flame guard is the use of a flame guard incorporating 0.160 inch diameter holes on 0.225 inch center distance for 62 holes in a staggered pattern.

What is claimed:

1. A system for luring and killing insects which incorporates the burning of paraffin to produce carbon dioxide and water vapor to attract insects comprising:
    means for holding and burning paraffin including paraffin;
    means for killing insects comprising an electrocuting killing field device; and
    an attaching device, wherein the means for holding and burning paraffin is attached to said electrocuting killing field device with the attaching device.

2. A system as claimed in claim 1 wherein said means for holding and burning paraffin comprises an assembly which includes a holder for the paraffin, a moveable flame guard, and a frame with a base.

3. A system as claimed in claim 2 wherein the holder for the paraffin is removable and held between the base and the moveable flame guard.

4. A system as claimed in claim 3 wherein said removable paraffin holder is made of heat resistant glass.

5. A system as claimed in claim 2 wherein the means for holding and burning paraffin further comprises the paraffin having an embedded wick.

6. A system as claimed in claim 5 wherein the means for holding and burning paraffin further comprises the paraffin having the wick being held in a thin metal cup.

7. A system as claimed in claim 6 wherein the frame holds both the base which in turn holds the holder for the paraffin containing the cup and the moveable flame guard and also provides said attaching device.

8. A system as claimed in claim 2 wherein the moveable flame guard is a perforated metal sheet or metal wire cloth.

9. A system as claimed in claim 2 wherein the frame of the assembly provides both means for allowing the flame guard to be lifted to allow removal of the paraffin holder and said attaching device.

10. A system as claimed in claim 1 wherein the electrocuting killing field device includes electrocuting electrodes with or without a UV fluorescent lamp.

11. A method of attracting insects to an electrocuting killing field device by the combustion of solid paraffin to produce carbon dioxide and water vapor near an electrocuting killing field device so as to kill the insects comprising:
    providing means for holding and burning paraffin including paraffin, means for killing insects comprising an electrocuting killing field device, and an attaching device;
    attaching said means for holding and burning paraffin to said electrocuting killing field device using said attaching device;
    attracting the insects to said electrocuting killing field device by combusting the paraffin to produce carbon dioxide and water vapor near said electrocuting killing field device.

12. A method as claimed in claim 11 wherein the electrocuting killing field device includes a high voltage electrocuting device with or without an electric lamp.

13. A method as claimed in claim 12 wherein the carbon dioxide and water vapor are released within 18 inches of the electrocuting killing field device.

* * * * *